T. CARPENTER.
PISTON PACKING.

No. 34,878. Patented Apr. 8, 1862.

Witnesses. Inventor.

UNITED STATES PATENT OFFICE.

TISDALE CARPENTER, OF PROVIDENCE, RHODE ISLAND.

PISTON-PACKING.

Specification of Letters Patent No. 34,878, dated April 8, 1862.

*To all whom it may concern:*

Be it known that I, TISDALE CARPENTER, of Providence, in the county of Providence and State of Rhode Island, have invented a new and useful Improvement in Piston-Packing; and I do hereby declare that the following is a full, clear, and exact description of the same, reference being had to the accompanying drawings, forming part of this specification, in which—

Figure 1:
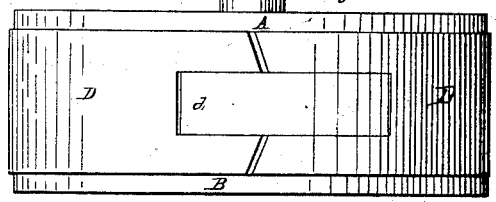
Figure 2:
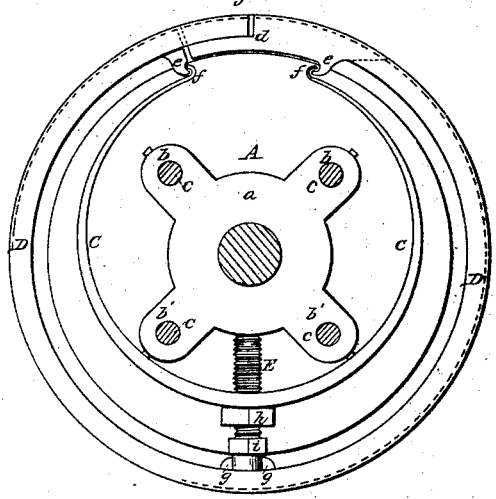
Figure 3:
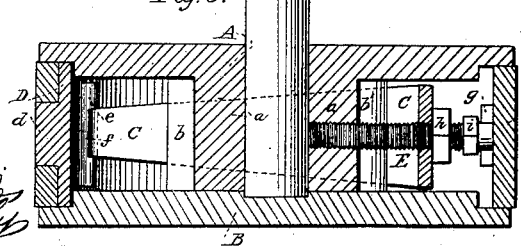

Figure 1, is a side view of a piston with my improved packing. Fig. 2, is a view of the interior of the same, when the follower is removed. Fig. 3 is an axial section of the same.

Similar letters of reference indicate corresponding parts in the several figures.

This invention consists in a novel combination and arrangement of an adjusting screw and nut and a circular expanding spring in connection with the packing ring or rings and head of the piston of a steam engine, pump, or other apparatus.

To enable others skilled in the art to apply my invention I will proceed to describe its construction and operation.

A, is the piston head made of the common form with the hub $a$, and lugs or projections $b$, $b$, $b'$, $b'$, cast upon it, the said lugs or projections being drilled and tapped for the reception of the screws $c$, $c$, which attach the follower B and two of the said lugs serving as bearings for the spring C and assisting the said spring to expand the packing ring D, as will be presently explained.

The piston represented is made with a single packing ring D, but two or more rings may be used, and these may be of any known or suitable construction. The ring D, represented has a lap and tongue joint $d$, to provide for its expansion and prevent the passage of the steam. On either side of the tongue joint there is formed upon the interior of the ring two hooks $e$, $e$, for the reception of hooks, $f$, $f$, formed on the ends of the spring, and opposite to the said hooks $e$, $e$, there are formed upon the interior of the ring two lugs $g$, $g$, which receive between them the end of the adjusting screw E.

The spring C, is of the form of nearly a full circle and has its ends turned outward to engage with the hooks $f$, $f$, which engage with the hooks $e$, $e$, on the packing ring.

The adjusting screw E, is arranged radially to the center of the piston and screws into a tapped hole in the hub $a$, of the piston head. The said screw also passes through a hole provided for it in the spring opposite to the space between the ends thereof and it is fitted outside of the spring with a nut $h$, and outside of the said nut, it has formed upon it a square collar for the reception of a wrench by which to screw it into or out from the hub. The outer end of the said screw is in contact with the packing ring.

The adjusting screw E serves the two purposes of preventing the packing ring from turning and of centering the said ring to the head of the piston. The turning of the ring is prevented by the screw fitting between the lugs $g$, $g$, and the centering is effected by screwing the screw into or out from the hub $a$, the spring operating upon the ring to keep the ring in contact with the outer end of the screw E and draw that side of the ring which is opposite to the said screw toward the center of the piston and the screw operating to hold that side of the ring out at a fixed distance from the center of the piston.

The nut $h$, serves to adjust the expansion of the packing ring for by screwing the said nut toward the hub of the piston the said nut is made to press the spring against the lugs $b$, $b$, of the piston head and the hooked ends of the said spring are thereby caused to act upon the hooks $e$, $e$, of the packing ring to expand it, and hence the outward pressure of the packing ring against the cylinder is made greater or less according as the nut is screwed up more or less toward the center of the piston.

The advantages resulting from the above described combination of a spring and adjusting screw applied to a piston packing, are as follows:—First—a slight movement of the nut toward the center of the piston will exert a great expansive power at the points $f$, $f$. Second, the distance between the bearing points of the spring upon the lugs $b'$, $b'$, of the piston head and the hooks $f$, $f$, is so great as to permit any degree of elasticity in the packing ring that may be desired, besides allowing greater uniformity of the expansive power, that is to say, the packing is not so rigid when first set out within the cylinder, and will retain a sufficient amount of expansive force to keep the piston tight for a longer time or for a greater amount of wear than the usual methods.

What I claim as my invention and desire to secure by Letters Patent, is—

The arrangement and combination of the circular expanding spring C applied in connection with the packing ring and piston head to operate substantially as and for the purposes herein specified.

TISDALE CARPENTER.

Witnesses:
  HENRY MARTIN,
  EZRA D. FOGG.